Nov. 23, 1926.
H. W. HICKS ET AL
1,607,983
VENDING MACHINE FOR BOTTLED BEVERAGES
Filed Jan. 25, 1923   3 Sheets-Sheet 1
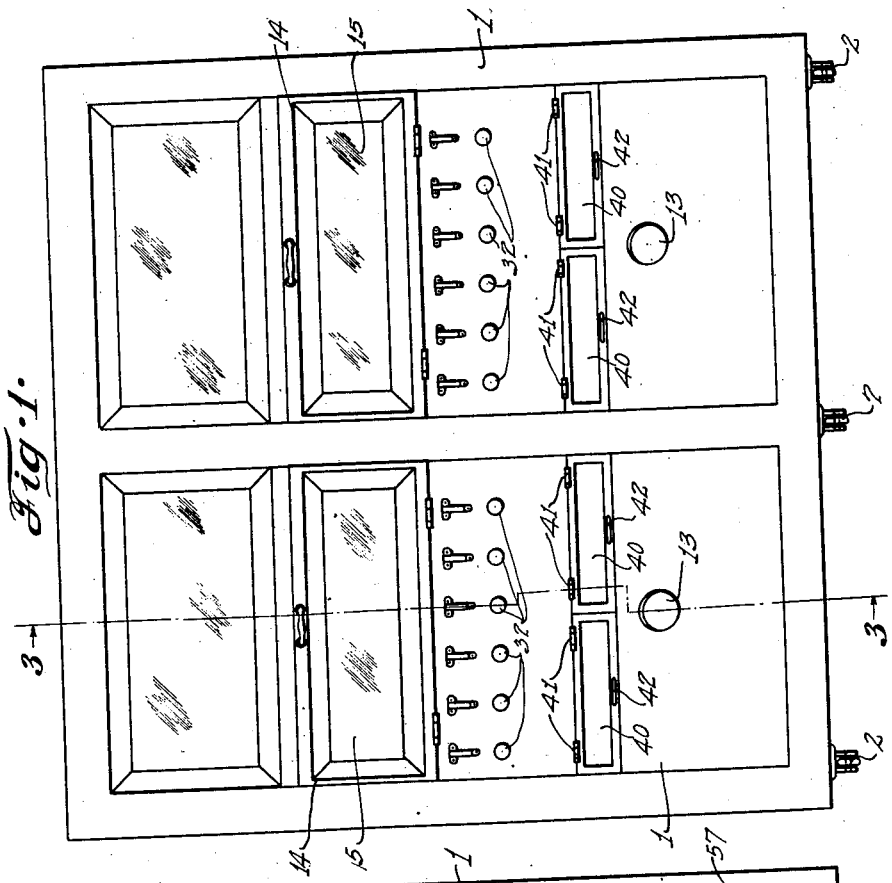
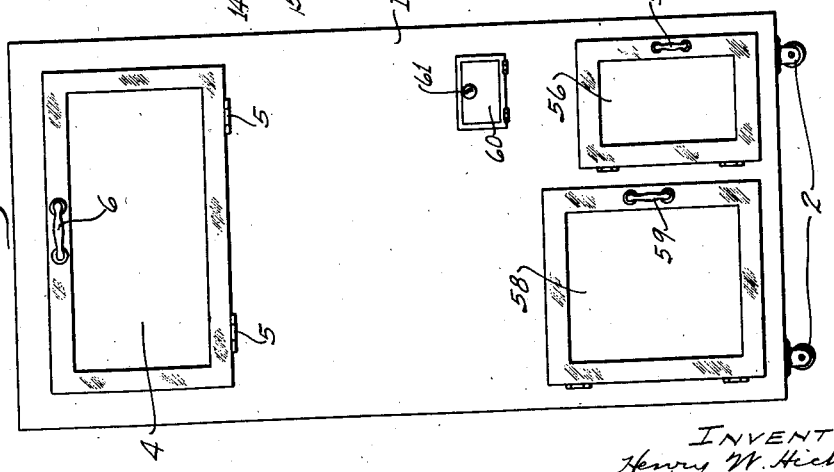
INVENTORS:
Henry W. Hicks,
William J. Norris,
BY Hugh K. Wagner,
ATTORNEY.

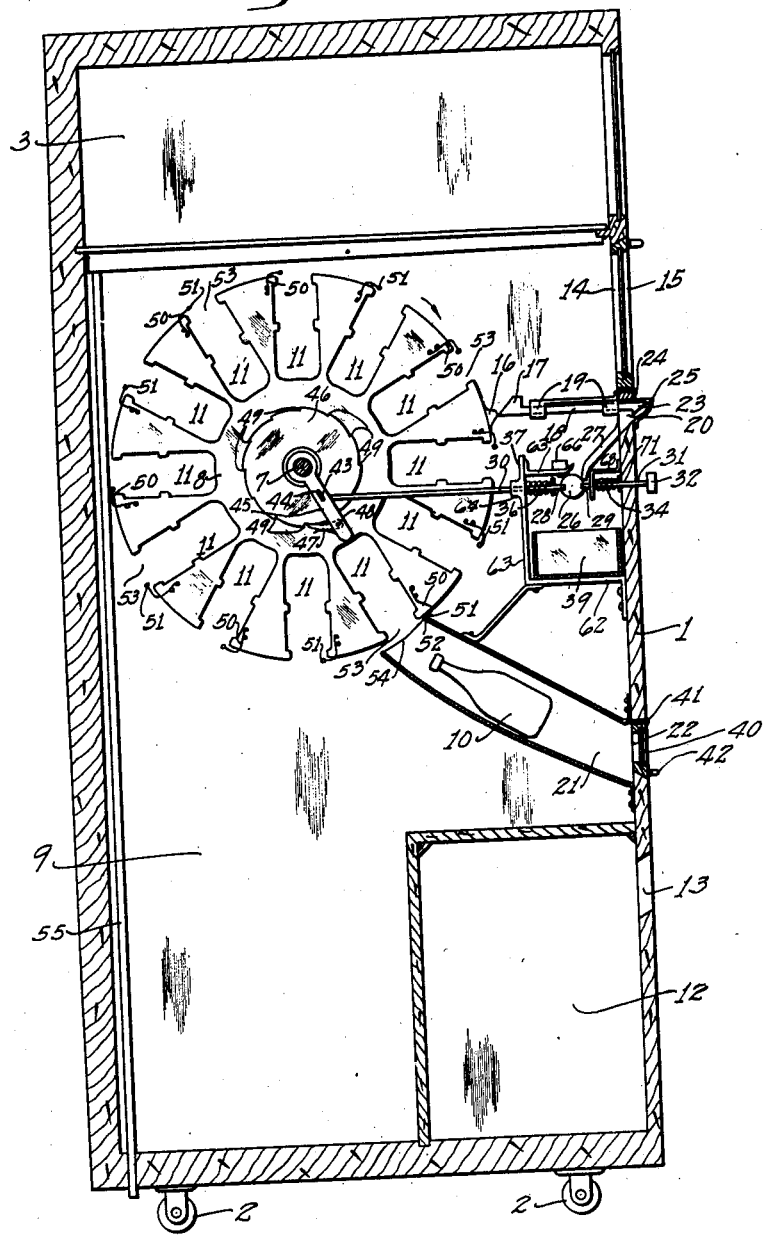

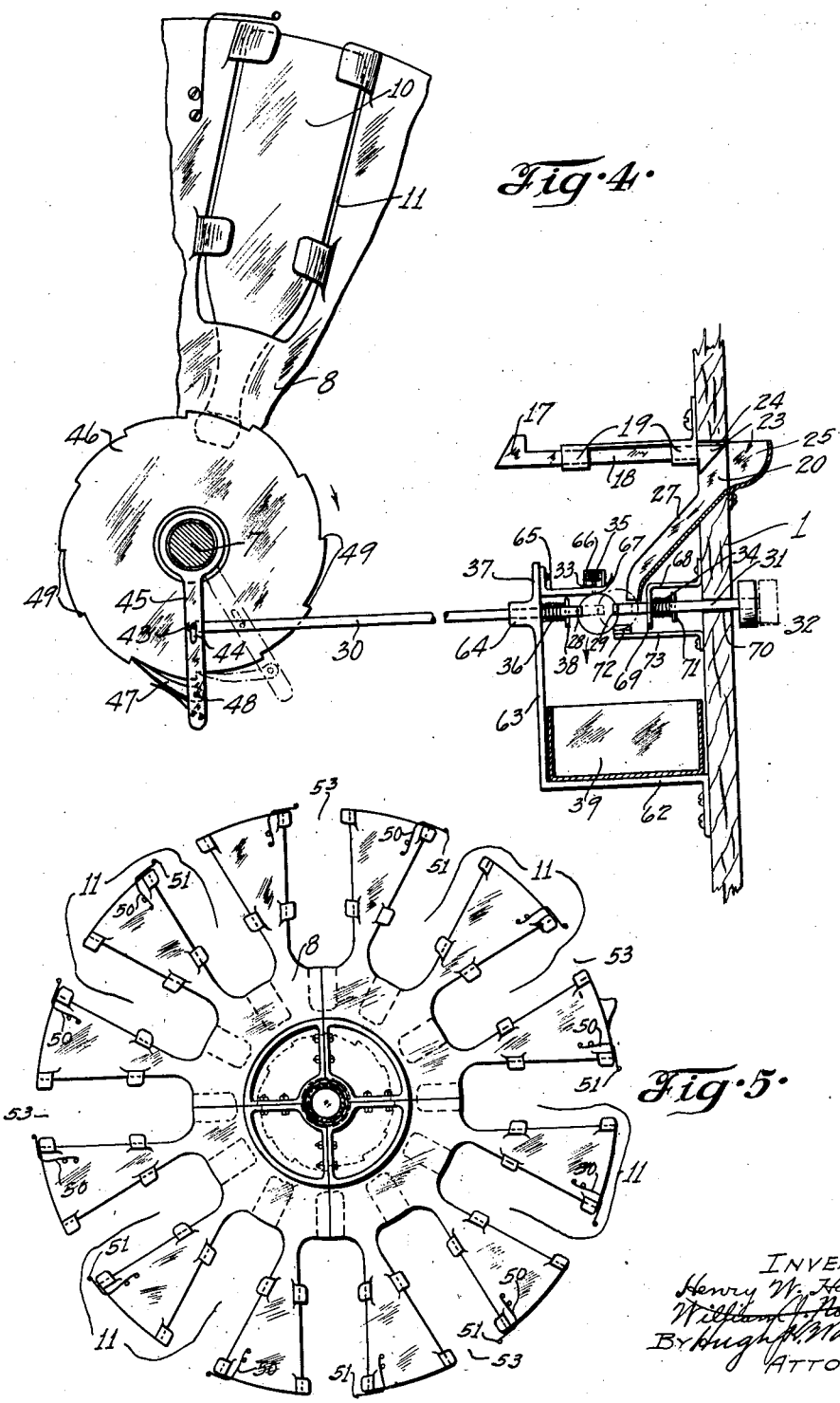

Patented Nov. 23, 1926.

1,607,983

UNITED STATES PATENT OFFICE.

HENRY WARD HICKS, OF ST. LOUIS, AND WILLIAM J. NORRIS, OF SPRINGFIELD, MISSOURI.

VENDING MACHINE FOR BOTTLED BEVERAGES.

Application filed January 25, 1923. Serial No. 614,765.

The object of this invention is to provide a coin-controlled vending machine for bottled soft drinks or other liquids which will be of the utmost simplicity in construction, the greatest reliability in use and action, and which will positively close the coin aperture when the contents of the machine have all been dispensed.

This apparatus may be used, also, for dispensing canned goods, put-up packages, and various other articles.

In the accompanying drawings forming part of this specification, in which like numbers of reference denote like parts wherever they occur, Figure 1 is a front elevation;

Figure 2 is a side elevation;

Figure 3 is a sectional view, taken on the line 3—3 of Fig. 1, looking in the direction indicated by the arrows;

Figure 4 is the same as part of Figure 3, but on an enlarged scale; and

Figure 5 is the same as another part of Figure 3, but on an enlarged scale.

The casing 1 may be of any suitable material, but is preferably quite solid or strong, so as to stand up under use. It is preferably provided with casters 2 for ease of movement when being changed from one place to another. It may be insulated in any desired manner, so as to exclude heat and retain cold. In it is provided an icebox or refrigerating compartment 3, to which access is afforded by door 4, hinged at 5 to the casing 1 and provided with the handle 6.

A shaft 7 is supported by the said casing 1, and bottle-wheel 8 is so mounted as to be adapted to rotate either on or with shaft 7. The refrigeration descending from compartment 3 into the compartment 9, in which wheel 8 is located, maintains the beverages in the bottles 10 seated in pockets 11 in the periphery of wheel 8 at a drinkable temperature. If it were desired to serve bottled warm or hot drinks in like manner, heating means can be located either in compartment 9 or in the equivalent of compartment 3 located in the lower part of compartment 9, as heat ascends while cold descends.

Compartment 12 is for the purpose of holding bottles 10 after they have been sold and emptied, and the said "empties" are inserted into compartment 12 through the opening or slot 13.

The bottles 10 are introduced through opening 14, after door 15 has been laid open, into the upper part of compartment 9, and inserted one by one into the pockets 11. There may be as many pockets 11 as desired, and the size of the wheel 8 may be varied, as also that of the cabinet 1.

A lug 16 on the outer periphery of wheel 8 is adapted to contact with latch 17, which is mounted on a shank 18, adapted to slide in the guides 19 and provided at its opposite end with the stop 20.

The last bottle in wheel 8 is located in a certain pocket 11 immediately in advance of the lug 16. In the drawings the said certain pocket 11 is the third one in advance of the lug 16, but this is only by way of illustration and depends upon the relative location of latch 17. These parts are all arranged in such manner that when the last bottle 10 has been dispensed through conveyer 21 and outlet 22, lug 16 contacts with latch 17 and pushes shank 18 so that its end 23 protrudes through opening 24 in the front wall of casing 1 and closes the coin aperture 25, thereby making it impossible for a would-be customer to deposit another coin 26 in the coin-chute 27.

When wheel 8 is loaded with filled bottles 10, the latch 17 will be pulled by the attendant into juxtaposition to the periphery of wheel 8, thereby opening the entrance to the coin aperture 25. A coin 26 may then be deposited therein and will slide or roll down chute 27 to the position shown in Figures 3 and 4, where it is caught in forks 28 and 29, formed in the ends of rods 30 and 31, respectively. The customer then pushes knob 32, which forces coin 26 and rod 30 forward in the direction of wheel 8 and, also, places coin 26 underneath spring-pressed plunger 33. Release of pressure on knob 32 allows spring 34 to return rod 31 and knob 32 to their original position, while the impulsion of spring 35 does the same with pin or plunger 33, thus exerting a downward pressure upon coin 26. Simultaneously the impulsion of spring 36, having a bearing between bracket 37 and pin 38, causes rod 30 to move towards its initial position, exerting a push upon coin 26. The release of the pressure of the fork 29 upon the coin 26 allows gravity to tend to cause it to fall into coin-box 39, which movement is assisted by the impulsion of springs 35 and 36. The coin-box 39 can be readily reached by the attendant through the opening 14. Naturally, a suitable lock will be provided for door 15.

Opening 22 is normally closed by doors 40, attached by hinges 41 to the front of casing 1 and manipulated by handles 42.

When knob 32 is pressed inwardly, motion is imparted by it to coin 26 and thence to rod 30, which is connected by pin 43 in slot 44 to arm 45, loosely mounted on shaft 7, while ratchet 46 is in fixed relation to wheel 8. A pawl 47 is pivoted at 48 to arm 45 and bites the notches 49 in ratchet 46.

One forward thrust of arm 30 is adequate to move arm 45 forward sufficiently, by means of pawl 47, to rotate ratchet 46 the distance of one notch, which has the effect of advancing one of the pockets 11 sufficiently toward a vertical position, so as to cause gravity to carry the bottle 10 thereout and into conveyer 21 toward opening 22. Until this point is reached the spring 50 fastened to wheel 8 adjacent to that pocket 11 has held bottle 10 within its pocket 11, but the rotation of wheel 8 in the direction indicated by the arrow causes the knobbed or beveled or smooth outer end 51 of spring 50 to be pressed so far back by contact with the edge 52 of conveyer 21 that a full opening for the emission of bottle 10 is provided at the mouth 53 of that pocket 11 opposite the mouth 54 of conveyer 21, continuous movement of the wheel 8 freeing the spring 50 from the edge of the conveyer 21.

It will be understood (although not shown in the drawings) that there will be as many wheels 8 within casing 1 as there are kinds of beverages to be sold, one such wheel being loaded with, for instance, bottles of soda, another with bottles of sarsaparilla, another with bottles of ginger ale, and so on, and the conveyer 21 may be either tubular leading up to each individual wheel or may be trough-like, with grooves formed in its bottom to act as guides from each individual wheel to outlet 22.

Pipe 55 is a drain-pipe from the icebox 3. If desired, there may be a similar one (though not shown in the drawings) from compartment 12, to carry off any remnants of beverage left in bottles deposited therein and which may happen to be upturned.

Door 56, having handle 57, permits entrance into compartment 12. Door 58, having handle 59, permits entrance into compartment 9. Both of these doors can be provided with locks, if desired.

An additional means of reaching the coinbox 39 besides through door 15 is provided by door 60, having the lock 61. The coin-box 39 is supported by bracket 62, the arm 63 of which forms a standard or journal for rod 30, being provided with the guide-boss 64.

A bracket 65 is fastened to arm 63 and is provided with the cup 66, containing the spring 35 and the upturned lip 67.

An elbow bracket 68 is fastened to the front of casing 1 and is provided with a hole through its arm 69, through which hole passes rod 31, being guided therein and through hole 70 in casing 1. Spring 34 abuts against pin 71 and the said arm 69.

When the coin 26 first descends through chute 27 it lands on bumper 72 on bracket 73, fastened to the front wall of casing 1. From this position it is pushed forward by the forked end of rod 31 into contact with the forked end of rod 30 and further movement in the same direction rotates ratchet 46, as hereinbefore described.

Having thus described this invention, we hereby reserve the benefit of all changes in form, arrangement, order, or use of parts, as it is evident that many minor changes may be made therein without departing from the spirit of this invention or the scope of the following claims.

We claim:

1. The combination with a casing, of a shaft supported thereby, a wheel mounted on the shaft and containing a plurality of pockets, a conveyor adapted for successive registration with the pockets, and means carried by the wheel controlling emission from each of the pockets and adapted to be moved into engagement with the conveyor to permit emission of the articles in the pockets into the conveyor, said means including a plurality of springs, each independently associated with a pocket and being of angle formation with one leg normally overlying the open end of the pocket.

2. The combination with a casing, of a shaft supported thereby, a wheel mounted on the shaft and containing a plurality of pockets, a conveyor adapted for successive registration with the pockets, means carried by the wheel controlling emission from each of the pockets and adapted to be moved into engagement with the conveyor to permit emission of the articles in the pockets into the conveyor, said wheel embodying a plurality of radial arms defining the spaced pockets, and article engaging clips carried by the arms at each side of the pockets.

3. The combination with a casing, of a shaft supported thereby, a wheel mounted on the shaft and containing a plurality of pockets, a conveyor adapted for successive registration with the pockets, means carried by the wheel controlling emission from each of the pockets and adapted to be moved into engagement with the conveyor to permit emission of the articles in the pockets into the conveyor, said means including a plurality of springs, each independently associated with a pocket and being of angle formation with one leg normally overlying the open end of the pocket, said wheel embodying a plurality of radial arms defining the spaced pockets, and article engaging clips carried by the arms at each side of the pockets.

4. In a vending machine for bottled beverages, a revoluble bottle carrier presenting radially disposed pockets of such depth as to enable the bottles to be wholly inserted therein, means for rotating the said carrier for successively advancing each of the said pockets sufficiently towards a vertical position to cause each bottle to slide outwardly by force of gravity towards the mouth of the pocket, a conveyor below the said carrier, and a spring fastened to the carrier adjacent each pocket and extending over the mouth of the pocket to normally hold the bottle therein, said spring having its outer end positioned to contact with the said conveyor during rotation of the said carrier, whereby it is adapted to be temporarily pressed back from the mouth of the pocket sufficiently to permit emission of the bottle onto the conveyor.

5. In a vending machine for bottled beverages, a vertically disposed revoluble bottle carrier presenting circumferentially spaced radial pockets of such depth as to permit the bottles to be entirely contained therein and being constructed and arranged to enable the bottle to be inserted head first therein, a conveyor below the said carrier, means for rotating the carrier for successively advancing the said pockets sufficiently toward a vertical position to cause the bottles to slide outwardly by force of gravity toward the mouth of the bottle, and a spring fastened to the carrier adjacent each pocket and extending over the mouth of the latter to provide a stop against which the bottom of the bottle in the pocket comes to rest when the pocket is in vertical or nearly vertical position, said spring being adapted, during rotation of the said carrier, to have its outer end pressed back by contact with the said conveyor to disengage the said bottle and permit free emission of the same from the said pocket.

In testimony whereof we hereunto affix our signatures.

HENRY WARD HICKS.
WILLIAM J. NORRIS.